(12) United States Patent
Hessling-von Heimendahl

(10) Patent No.: US 10,189,579 B2
(45) Date of Patent: Jan. 29, 2019

(54) DYNAMIC EXTERIOR AIRCRAFT LIGHT UNIT AND METHOD OF OPERATING A DYNAMIC EXTERIOR AIRCRAFT LIGHT UNIT

(71) Applicant: Goodrich Lighting Systems GmbH, Lippstadt (DE)

(72) Inventor: Andre Hessling-von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 54 days.

(21) Appl. No.: 15/260,604

(22) Filed: Sep. 9, 2016

(65) Prior Publication Data

US 2017/0073083 A1   Mar. 16, 2017

(30) Foreign Application Priority Data

Sep. 10, 2015   (EP) .................................... 15184617

(51) Int. Cl.
| | |
|---|---|
| *B60Q 1/00* | (2006.01) |
| *B64D 47/06* | (2006.01) |
| *F21S 43/14* | (2018.01) |
| *B64D 47/04* | (2006.01) |
| *F21V 23/04* | (2006.01) |

(Continued)

(52) U.S. Cl.
CPC .............. *B64D 47/06* (2013.01); *B60Q 1/085* (2013.01); *B64D 47/04* (2013.01); *F21S 41/143* (2018.01); *F21S 41/255* (2018.01); *F21S 41/663* (2018.01); *F21S 43/14* (2018.01); *F21V 23/0492* (2013.01); *B60Q 1/12* (2013.01); *B60Q 2300/114* (2013.01); *B64D 2203/00* (2013.01);

(Continued)

(58) Field of Classification Search
CPC .... B64D 2203/00; B64D 47/04; B64D 47/06; F21S 48/215; F21S 23/0492; F21W 2101/06; F21Y 2115/10
See application file for complete search history.

(56) References Cited

U.S. PATENT DOCUMENTS 5,355,131 A * 10/1994 Metz ...................... B64D 47/04
340/981
8,337,059 B2 * 12/2012 Barnett .................. B64D 47/04
362/470

(Continued)

FOREIGN PATENT DOCUMENTS

| | | |
|---|---|---|
| DE | 10159134 A1 | 6/2003 |
| WO | 9618524 A1 | 6/1996 |

(Continued)

OTHER PUBLICATIONS

European Search Report for Application No. 15184617.7-1754 dated Mar. 15, 2016; 7 Pages.

*Primary Examiner* — Ali Alavi

(74) *Attorney, Agent, or Firm* — Cantor Colburn LLP

(57) ABSTRACT

A dynamic exterior aircraft light unit, mounted to an aircraft for illuminating an aircraft environment, includes an LED group with a plurality of LEDs, and an optical system with at least one optical element. The optical system being associated with the LED group for shaping an output light intensity distribution from the light emitted by the LED group and the LED group and the optical system are stationary within the dynamic exterior aircraft light unit.

12 Claims, 5 Drawing Sheets

(51) Int. Cl.
*B60Q 1/08* (2006.01)
*F21S 41/143* (2018.01)
*F21S 41/255* (2018.01)
*F21S 41/663* (2018.01)
*F21W 107/30* (2018.01)
*F21Y 115/10* (2016.01)
*B60Q 1/12* (2006.01)
*F21Y 105/10* (2016.01)

(52) U.S. Cl.
CPC ...... *F21W 2107/30* (2018.01); *F21Y 2105/10* (2016.08); *F21Y 2115/10* (2016.08)

(56) References Cited

U.S. PATENT DOCUMENTS

| | | | | |
|---|---|---|---|---|
| 9,856,035 | B1* | 1/2018 | Keller | B64D 47/04 |
| 2008/0137353 | A1* | 6/2008 | Larsen | B64D 47/04 |
| | | | | 362/470 |
| 2014/0143034 | A1* | 5/2014 | Pi | H04B 10/116 |
| | | | | 705/14.4 |
| 2015/0146442 | A1* | 5/2015 | Bonnefous | B64D 47/04 |
| | | | | 362/467 |

FOREIGN PATENT DOCUMENTS

| | | | |
|---|---|---|---|
| WO | 2009022165 A2 | | 2/2009 |
| WO | WO2009/022165 | * | 2/2009 |

* cited by examiner

DYNAMIC EXTERIOR AIRCRAFT LIGHT UNIT AND METHOD OF OPERATING A DYNAMIC EXTERIOR AIRCRAFT LIGHT UNIT

FOREIGN PRIORITY

This application claims priority to European Patent Application No. 15184617.7 filed Sep. 10, 2015, the entire contents of which is incorporated herein by reference.

TECHNICAL FIELD

The present invention is in the field of exterior aircraft lighting. In particular, the present invention relates to aircraft headlights, i.e. such lights that help the pilots of the aircraft in viewing the environment in front of them, when operating the aircraft. Examples of aircraft headlights are landing lights, take-off lights, taxi lights, and runway turn-off lights.

BACKGROUND

Large commercial aircraft have many different exterior lights. An exemplary group of exterior aircraft lights are lights for passive visibility, such as navigation lights and anti-collision lights. Another example of exterior aircraft lights are headlights that allow the pilots to view the area in front of them, when they are seated in the cockpit. Large commercial aircraft have a variety of different headlights, such as one or more taxi lights, one or more take-off lights, one or more landing lights, and one or more runway turn-off lights. These headlights are supposed to illuminate the portion of the aircraft environment where the pilot's attention is most required during the given operating scenario. In particular with respect to illuminating the landing target, i.e. the airport runway, and with illuminating the flight direction during the early airborne phases after take-off, prior art exterior aircraft light units are not yet satisfactory.

Accordingly, it would be beneficial to provide exterior aircraft light units that allow for an improved illumination of the relevant portion of the aircraft environment.

SUMMARY

Exemplary embodiments of the invention include a dynamic exterior aircraft light unit, configured for being mounted to an aircraft for illuminating an aircraft environment, the dynamic exterior aircraft light unit comprising an LED group, comprising a plurality of LEDs, and an optical system, comprising at least one optical element, the optical system being associated with the LED group for shaping an output light intensity distribution from the light emitted by the LED group, wherein the LED group and the optical system are stationary within the dynamic exterior aircraft light unit, with each LED of the LED group having a set position with respect to the optical system, wherein the dynamic exterior aircraft light unit is configured to be operated in a plurality of operating modes, with a respective subset of the plurality of LEDs being switched on in each of the plurality of operating modes and with a different output light intensity distribution being emitted by the dynamic exterior aircraft light unit in each of the plurality of operating modes, with a selection of the operating mode depending on an acceleration of the aircraft.

Exemplary embodiments of the invention allow for an adaptation of the output light intensity distribution with respect to an estimate of the true heading direction of the aircraft, while being low in complexity. During start and landing situations, the acceleration of the aircraft provides for a good indication of where the aircraft is flying. This direction of flight with respect to the stationary environment, also referred to as true heading direction herein, in turn corresponds to the portion of the environment that the pilot regularly is most interested in. For example, during the approach to the runway in a landing situation, the pilot is most interested in checking the direction towards the landing target for potential obstacles. This direction of flight can be estimated well via the acceleration of the aircraft. At the same time, the acceleration of the aircraft can be determined with relatively low complexity. Acceleration sensors are components that are able to determine the instances of acceleration in the aircraft frame of reference with low complexity, low space requirements and low additional weight. Further, acceleration measurements are able to indicate both the aircraft-induced acceleration, such as caused by the engines and/or actuation of the control flaps of the aircraft, as well as environment-induced acceleration, such as due to cross-winds.

The exterior aircraft light unit is dynamic in that it is able to output a variety of different output light intensity distributions. In particular, the dynamic exterior aircraft light unit is able to direct the light output into different directions. The dynamic properties are achieved on an electric level by operating different subsets of the plurality of LEDs in different operating modes. In this way, different output light intensity distributions can be achieved without mechanically altering the position of the dynamic exterior aircraft light unit or its components. However, it is pointed out that a combination of a mechanical altering of the position and an electric control of different subsets of the plurality of LEDs is possible as well.

It is possible that each of the plurality of LEDs of the LED group is individually controllable, i.e. that each of the plurality of LEDs can be individually switched on/off. However, it is also possible that sub-groups of the plurality of LEDs are controllable together. In other words, it is possible that different sub-groups of LEDs exist that can be jointly switched on/off. Jointly controlled sub-groups of the plurality of LEDs and individually controlled LEDs may also be combined for reaching a dynamic exterior aircraft light unit that is sufficiently adaptive to a particular range of operating scenarios and that still has a low switching complexity.

The term acceleration of the aircraft refers to a change of speed of the aircraft. It corresponds to an outside force exerted on the aircraft and/or a change of speed caused by the aircraft operation. The term acceleration includes both positive accelerations, i.e. increases in speed, as well as negative accelerations, i.e. decreases in speed, also referred to as decelerations herein. The term acceleration of the aircraft may refer to the acceleration of the aircraft in one particular dimension, such as the longitudinal, transverse or vertical dimension in the aircraft frame of reference, or to any combination of dimensions. It may also refer to a resulting vector in a three-dimensional space. For example, the term acceleration may refer to a vector having three components in a Cartesian coordinate system. The acceleration of the aircraft may also be represented in any other suitable manner. It is not required that the acceleration of the aircraft is a complete representation of all forces accelerating the aircraft. It may describe a subset of all forces and/or dimensions. The term acceleration in particular refers to the acceleration with respect to the aircraft frame of reference.

The optical system is associated with the LED group. In other words, the optical system is arranged with respect to the LED group in such a way that at least a substantial portion of the light emitted by the LED group is emitted towards the optical system and is effected by the optical system. The optical system comprises at least one optical element. Optical elements may be reflectors and/or lenses. The optical system may comprise one or more reflectors or one or more lenses or a combination of one or more reflectors and one or more lenses.

The dynamic exterior aircraft light unit may comprise a control unit that is configured to control each LED of the LED group or sub-groups of the LED group independently. There may be provided a control unit that may put each LED of the LED group in an on state individually. In a particular embodiment, there may be provided a control unit that controls an individual on/off switch for each LED of the LED group. It is also possible that the control unit controls a dimming state of each LED of the LED group individually. Each of the LEDs is configured to emit light in operation. Accordingly, when switched on, each of the LEDs emits light.

The dynamic exterior aircraft light unit is configured to be operated in a plurality of operating modes. For each operating mode, a subset of the plurality of LEDs is predefined. In other words, for each operating mode, a fixed correlation exists between the particular operating mode and a particular subset of the plurality of LEDs. The predefined subset of LEDs, which are switched on for a particular operating mode, is referred to as the respective subset for that particular operating mode. A particular operating mode corresponds to a particular subset of the plurality of LEDs to be switched on. The subset comprises at least one LED of the LED group, but not all LEDs of the LED group. In other words, the term subset refers to a particular selection of the plurality of LEDs. Accordingly, in any given operating mode, at least one LED is switched on and at least one LED is not switched on. It is also possible that two or more of the plurality of LEDs are switched on in each operating mode and/or that two or more of the plurality of LEDs are not switched on in each operating mode.

According to a further embodiment, less than 60%, in particular less than 50%, further in particular less than 40%, of the plurality of LEDs are switched on in each of the plurality of operating modes. In other words, the respective subset of LEDs being switched on may comprise less than 60%, in particular less than 50%, further in particular less than 40%, of the plurality of LEDs for each of the plurality of operating modes. In this way, the dynamic exterior aircraft light unit may provide for different output light intensity distributions, as discussed above, while keeping the maximum power consumption below a predefined level that corresponds to the maximum number of LEDs that can be switched on at any given time. In this way, the design of the power wiring to the dynamic exterior aircraft light unit only has to be able to support said maximum power consumption. Also, in this way, the maximum load that the dynamic exterior aircraft light unit may pose on the aircraft electricity network is significantly below the load that all of the LEDs would create when switched on at the same time. Moreover, by having less than 60%, in particular less than 50%, further in particular less than 40%, of the plurality of LEDs switched on in each of the plurality of operating modes, the overall heat dissipation may be kept below a threshold level, which in turn allows for keeping the operating temperature of the dynamic exterior aircraft light unit below a threshold level and thus for limiting the thermal stress on the electronic components.

According to a further embodiment, the plurality of LEDs of the LED group are arranged in one of a two-dimensional LED array and a linear LED row. The term two-dimensional LED array is to be understood in such a way that the plurality of LEDs are not arranged in a row-like or line-like configuration, but that the plurality of LEDs are spaced apart from each other in two dimensions. Within the two-dimensional LED array, the plurality of LEDs may be arranged in a regular pattern or in an irregular manner. The two-dimensional LED array may be a two-dimensional LED matrix, wherein the plurality of LEDs are arranged in a rectangular area in an evenly spaced manner. Such an arrangement allows for great flexibility to create many useful operating modes. It is also possible that the plurality of LEDs are arranged in a linear LED row. Such an arrangement allows for a plurality of operating modes whose output light intensity distributions substantially differ in one dimension only. This may be sufficient for a variety of applications.

According to a further embodiment, the selection of the operating mode depends on the acceleration of the aircraft over an acceleration consideration interval. In this way, various momentary acceleration values over an extended time interval are taken into account for carrying out the selection of the operating mode. In this way, the operating mode does not depend on a single acceleration measurement, but on multiple acceleration measurements over a given time interval. In this way, the selection of the operating mode contains a higher degree of information with respect to the true heading direction of the aircraft.

According to a further embodiment, the acceleration consideration interval is between 5 s and 1 min, in particular between 10 s and 40 s. It has been found that the stated length of the acceleration consideration interval provides for an optimized compromise between containing sufficient information about the long-term flight situation and giving momentary acceleration developments sufficient weight for adapting the output light intensity distribution accordingly. It is pointed out that this feature excludes acceleration measurements for selecting the appropriate operating mode that are older than the length of the acceleration consideration interval. Multiple acceleration values may be measured and considered during the acceleration consideration interval. For example, the sampling rate for the measurements of the acceleration of the aircraft may be between one time and one hundred times per second.

According to a further embodiment, the acceleration consideration interval is a rolling time interval. In other words, the acceleration consideration interval may, for any given point in time during the operation of the dynamic exterior aircraft light unit, take into account the acceleration of the aircraft during the immediate past, with the values taken into account being in the immediately passed acceleration consideration interval. For example, if the acceleration consideration interval is 1 min, the dynamic exterior aircraft light unit is configured to take into account the acceleration of the aircraft during the passed minute for any given point in time. In this way, it is ensured that less relevant information that has passed by more than the acceleration consideration interval is replaced by current information for the selection of the operating mode.

According to a further embodiment, the dynamic exterior aircraft light unit is configured to determine a net acceleration direction from the acceleration of the aircraft over the acceleration consideration interval, wherein the selection of the operating mode depends on the net acceleration direction. In this way, a good trade-off between taking into account an extended set of acceleration values and low complexity in selecting an appropriate operating mode can be achieved. In particular, by determining the net acceleration direction from the acceleration of the aircraft over the acceleration consideration interval, a time series of acceleration values over the acceleration consideration interval can be condensed into a meaningful parameter. This meaningful parameter can then form the basis for the selection of the appropriate operating mode, giving rise to a direct, quick and reliable correspondence between net acceleration directions and operating modes. The term net acceleration direction is intended to refer to a composite value that is derived from a time series of individual acceleration values. The net acceleration direction is derived from the time series of acceleration values via a predetermined function or via one of a set of predetermined functions and provides an indication of the combination of all accelerations within the acceleration consideration interval. The net acceleration direction may be a single parameter, denoting e.g. a particular direction in space, which parameter may be represented via a single value, encoding said direction, or via a set of components, such as a three-dimensional vector. It is pointed out that, for determining the net acceleration direction, it is possible that the acceleration components in one or more selected dimensions are weighed, as compared to other dimensions. An estimate of the true heading direction of the aircraft may be a direction inverse to the net acceleration direction. This will become more apparent from the description of the exemplary embodiments. While it is possible that the net acceleration direction is an average value of the acceleration measurements, the determination of the net acceleration direction may also be carried out in accordance with other functions.

According to a further embodiment, each of the plurality of operating modes has a main light emission direction and the plurality of operating modes differ with respect to their main light emission directions, with the selection of a particular operating mode being such that the main light emission direction of the particular operating mode corresponds to the net acceleration direction. In other words, on the basis of the net acceleration direction, which is an indication of the direction in which the aircraft has been accelerated during the acceleration consideration interval, a corresponding main light emission direction of the dynamic exterior aircraft light unit is selected via the appropriate operating mode. In this context, it is pointed out that the main light emission direction corresponding to the net acceleration direction does not require a perfect alignment of the main light emission direction and the net acceleration. Due to a limited granularity of the operating modes, it is possible that the selected main light emission direction may be the main light emission direction available that is closest to the net acceleration direction. Also, the correspondence between the net acceleration direction and the main light emission direction does not necessarily require those two directions to be oriented in the same way. While such orientation in the same way is generally present for the starting phase, where both the acceleration and the light emission are in a forward direction, the net acceleration direction and the main light emission direction of the selected operating mode may have opposite directivity in the landing scenario, where the net acceleration may be directed towards the back of the flight path, while the main light emission direction of the selected operating mode may be towards the front. In other words, the dynamic exterior aircraft light unit may be configured to determine an estimate of the true heading direction on the basis of the net acceleration direction, with the estimate being either aligned or counter-aligned with the net acceleration direction, depending on the flight scenario. This estimate may then be used for selecting an operating mode with a maximally aligned main light emission direction. By selecting a main light emission direction that corresponds to the net acceleration direction in above described manner, the dynamic exterior aircraft light unit is able to provide the region of highest illumination along the estimated flight path of the aircraft, as indicated by the net acceleration direction, leading to an optimized illumination of the most relevant part of the aircraft environment for the pilot.

According to a further embodiment, the dynamic exterior aircraft light unit is configured to determine the net acceleration direction on the basis of at least one of an average of the acceleration of the aircraft over the acceleration consideration interval, a weighed average of the acceleration of the aircraft over the acceleration consideration interval, and a histogram analysis of the acceleration of the aircraft over the acceleration consideration interval. In other words, when a set of acceleration values, as determined/measured/received over the acceleration consideration interval, are present, the net acceleration direction may be determined by various functions, including an average function, a weighed average function, or a value determination on the basis of a histogram analysis. The net acceleration direction may also be determined from a combination of these functions, potentially in combination with other suitable functions. Via the weighing of the individual values/components in the determination by weighed average, the acceleration at different points in time during the acceleration consideration interval and/or the acceleration in certain dimensions may be stressed. Also, with a histogram analysis, outliers in the acceleration data may be disregarded.

According to a further embodiment, the acceleration of the aircraft is a three-dimensional acceleration of the aircraft. In particular, the three dimensions of the acceleration of the aircraft may be the longitudinal direction of the aircraft (i.e. the front/back direction of the aircraft), the transverse direction of the aircraft (i.e. the left/right direction of the aircraft), and the vertical direction of the aircraft (i.e. the top/bottom direction of the aircraft). In other words, the acceleration of the aircraft may be a three-dimensional acceleration of the aircraft in a Cartesian coordinate system in the aircraft frame of reference. Analogously, the net acceleration direction may be a three-dimensional net acceleration direction of the aircraft.

According to a further embodiment, the acceleration of the aircraft is a gravity-compensated acceleration of the aircraft. In other words, the acceleration of the aircraft is a parameter that reflects various forces acting on the aircraft, with the exception of gravity. The acceleration of the aircraft may be the total acceleration of the aircraft minus the acceleration exerted onto the aircraft by gravity. In this way, the acceleration in the aircraft frame for reference is a better indication of the acceleration with respect to the environment, leading to a more optimized correspondence between the direction of illumination and the true aircraft heading.

According to a further embodiment, the dynamic exterior aircraft light unit comprises an acceleration signal input, configured for receiving acceleration data with respect to the acceleration of the aircraft from an external source. The external source may be one or more external acceleration sensors, measuring the acceleration of the aircraft in one or more directions, or a board computer that has acceleration data of the aircraft as readily available data. In this way, the dynamic exterior aircraft light unit can be provided in a very compact manner, relying on acceleration data gathered in other parts of the aircraft.

According to a further embodiment, the dynamic exterior aircraft light unit comprises at least one acceleration sensor, configured to measure the acceleration of the aircraft. In other words, the dynamic exterior aircraft light unit may itself comprise one or more acceleration sensors in order to determine the acceleration of the aircraft in one or more dimensions. In this way, the dynamic exterior aircraft light unit may be embodied as a stand alone component that can adapt the output light intensity distribution by selecting an appropriate operation mode without relying on data from external sources. It is pointed out that the generation of the acceleration data within the dynamic exterior aircraft light unit may be combined with receiving acceleration data from an external source, with the two sources being used for providing complementary portions of the acceleration data or for cross-checking the acceleration data for accuracy and/or integrity.

According to a further embodiment, the dynamic exterior aircraft light unit is configured to increase an opening angle of the output light intensity distribution for a negative acceleration in a longitudinal direction of the aircraft. In this way, when the aircraft is decelerating, such as is common in a landing scenario, the light output of the dynamic exterior aircraft light unit becomes wider, reflecting a decreased importance of a long-range, pointy output peak for a decreased velocity scenario and taking into account the increased importance of awareness of a wider environment when getting closer to ground. Such functionality may in particular be embodied in a landing light unit.

According to a further embodiment, the dynamic exterior aircraft light unit is configured to decrease an opening angle of the output light intensity distribution for a positive acceleration in a longitudinal direction of the aircraft. In this way, the dynamic exterior aircraft light unit takes into account the increased importance of a smaller sector in a more concentrated direction for an increase in speed of the aircraft. This functionality makes it easier for the pilot to concentrate on and be aware of the true heading direction of the aircraft, without being distracted as much by the environment around this true heading direction, as the aircraft speed increases. Such functionality may in particular be embodied in a take-off light.

According to a further embodiment, the dynamic exterior aircraft light unit may be a landing light unit or a take-off light unit or a taxi light unit or a runway turn-off light unit. It is also possible that the dynamic exterior aircraft light unit is a light unit that combines the functionalities of two or more of these exemplary light units. In particular, the dynamic exterior aircraft light unit may comprise any subset and also all of the functionalities of the four mentioned light units. For example, the dynamic exterior aircraft light unit may be a combined landing, taxi and runway turn-off light unit. In another example, the dynamic exterior aircraft light unit may be a combined landing and take-off light unit. In the context of the present document, when a light unit is referred to as a landing light unit or a take-off light unit or a taxi light unit or a runway turn-off light unit, this does not exclude the light unit to have additional ones of these functionalities. Rather, it means that the one functionality indicated by the name is present and that other functionalities may or may not be present.

According to a further embodiment, the output light intensity distribution of each of the plurality of operating modes has an opening angle of less than 15°, in particular of between 5° and 10°, around the respective main light emission distribution. Such opening angles have been found to be a good compromise between providing a targeted output light intensity distribution at acceptable power consumption levels, while providing for sufficient breadth of the output light intensity distribution for the case that the estimate of the true heading direction and the true heading direction of the aircraft do not exactly match. Also, said opening angle values allow for good visibility of extended areas of interest.

According to a further embodiment, the output light intensity distributions of all operating modes have a combined horizontal opening angle of between 30° and 60°, in particular of between 35° and 45°, and/or a combined vertical opening angle of between 10° and 30°, in particular of between 15° and 25°. The terms horizontal opening angle and vertical opening angle refer to the orientation of the dynamic exterior aircraft light unit when mounted to the aircraft. In particular, the horizontal opening angle is the opening angle of the dynamic exterior aircraft light unit in a horizontal cross-sectional plane, and the vertical opening angle is the opening angle of the dynamic exterior aircraft light unit in a vertical cross-sectional plane through the dynamic exterior aircraft light unit. It is pointed out that the limit values, as stated above for the individual and combined opening angles, do not require the light intensity to drop to zero at these angles. Rather, the limit values may be defined as angles where the output light intensity distribution has dropped to below 10% of the peak intensity of that operating mode.

According to a further embodiment, the number of LEDs of the dynamic exterior aircraft light unit is at least 20, in particular at least 30, further in particular at least 40. With such a high number of LEDs, a high number of operating modes can be implemented. The LEDs of the dynamic exterior aircraft light unit may be arranged in one LED group, being associated with one optical system, or in a plurality of LED groups, being associated with a plurality of optical systems. The number of LEDs of the dynamic exterior aircraft light unit may be below 70, in particular below 60.

According to a further embodiment, the dynamic exterior aircraft light unit has exactly one optical system, with all of the plurality of LEDs being associated with the exactly one optical system and with light output by the plurality of LEDs being affected differently by the exactly one optical system due to their different positioning with respect thereto. In this way, a high integration and low overall space requirements for the light unit can be achieved. The LEDs are all associated with the exactly one optical system, i.e. only one optical system is present that shapes the output light intensity distribution. Having different positions, each of the LEDs is affected differently by the optical system and, thus, contributes to the output light intensity in a different manner. By operating respective subsets of the LEDs, the different output light intensity distributions of the different operating modes can be achieved.

According to an alternative embodiment, the LED group comprises at least two LED sub-groups and the optical system comprises at least two optical sub-systems, with each LED sub-group forming an optical set with a respective optical sub-system and with each optical set being optically independent from the other optical sets. In this way, optical sets are provided that may be designed independently from each other. Each optical set may be optimized for a particular contribution to the output light intensity distribution. In this way, the output light intensity distributions may be the result of the combined operation of different optical sets, which may lead to a more optimized illumination of the aircraft environment across the different operating modes. This approach may lead to more degrees of freedom in the design of the light unit for a particular application. It is possible that the LED sub-groups consist of one LED. However, it is also possible that there are multiple optical sets, as described above, and that each or some of the multiple optical sets have several LEDs contained therein. In this way, an optimized compromise between highly accurate light output and low space requirements may be achieved.

Exemplary embodiments of the invention further include an aircraft, comprising at least one dynamic exterior aircraft light unit according to any of the preceding claims, mounted externally to the aircraft. The external mounting may be at a position that belongs to the external portion of the aircraft in all operating scenarios, such as a mounting to the aircraft fuselage or the wings, but may also be at a position that is external only in certain operating scenarios, such as during landing, taxi, and/or take-off, such as a mounting position at a running gear of the aircraft. The aircraft may be an air plane, in particular a large commercial passenger and/or cargo air plane. The modifications, additional features, and effects, described above with respect to the dynamic exterior aircraft light unit, equally apply to the aircraft having such a dynamic exterior aircraft light unit.

Exemplary embodiments of the invention further include a method of operating a dynamic exterior aircraft light unit, comprising an LED group, comprising a plurality of LEDs, and an optical system, comprising at least one optical element, the optical system being associated with the LED group for shaping an output light intensity distribution from the light emitted by the LED group, wherein the method comprises the steps of determining an acceleration of the aircraft, selecting one of a plurality of operating modes depending on the acceleration of the aircraft, with the plurality of operating modes differing with respect to their respective output light intensity distributions emitted by the dynamic exterior aircraft light unit, and switching on a respective subset of the plurality of LEDs depending on said selected one of the plurality of operating modes. The modifications, additional features, and effects, described above with respect to the dynamic exterior aircraft light unit, equally apply to the method of operating a dynamic exterior aircraft light unit and to the dynamic exterior aircraft light unit of the method of operating the same. In particular, method steps analogous to the apparatus features described above are explicitly disclosed herewith. The step of determining the acceleration of the aircraft comprises at least one of measuring the acceleration of the aircraft and receiving acceleration data from an external source, such as from a board computer or an acceleration sensor, external to the dynamic exterior aircraft light unit.

According to a further embodiment, the method further comprises the step of determining a net acceleration direction of the aircraft from the acceleration of the aircraft over an acceleration consideration interval, wherein said one of the plurality of operating modes is selected depending on the net acceleration direction.

BRIEF DESCRIPTION OF THE DRAWINGS

Further exemplary embodiments of the invention are described with respect to the accompanying drawings, wherein.

DETAILED DESCRIPTION

Figure 1A:
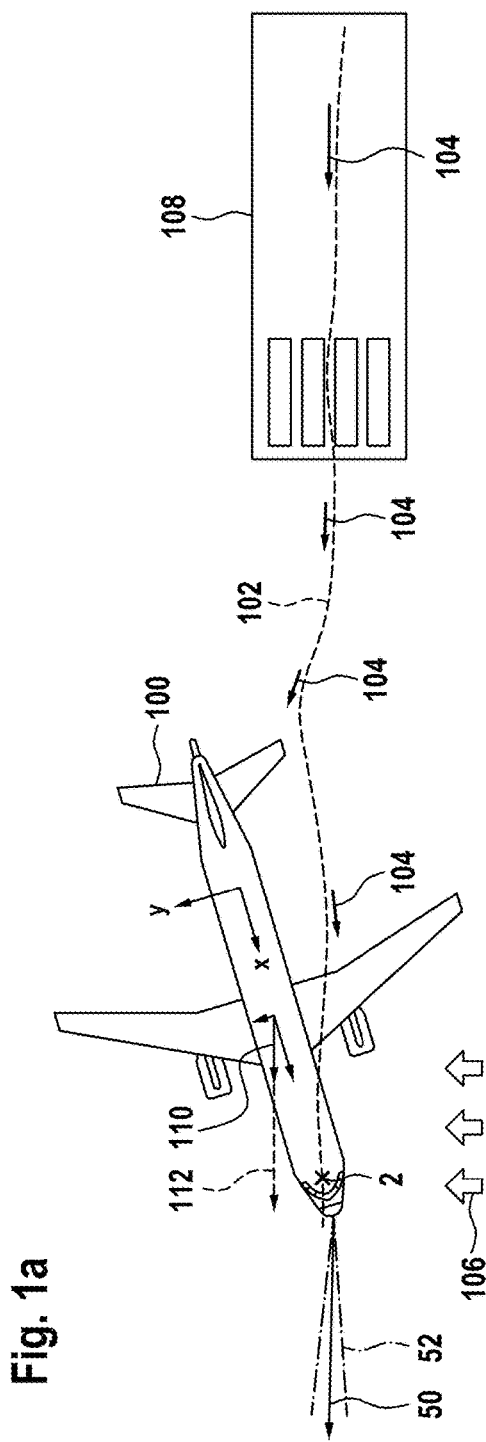
FIGS. 1a-1b show an aircraft, equipped with a dynamic exterior aircraft light unit in accordance with exemplary embodiments of the invention, in a top view during a take-off operation.
Figure 2:
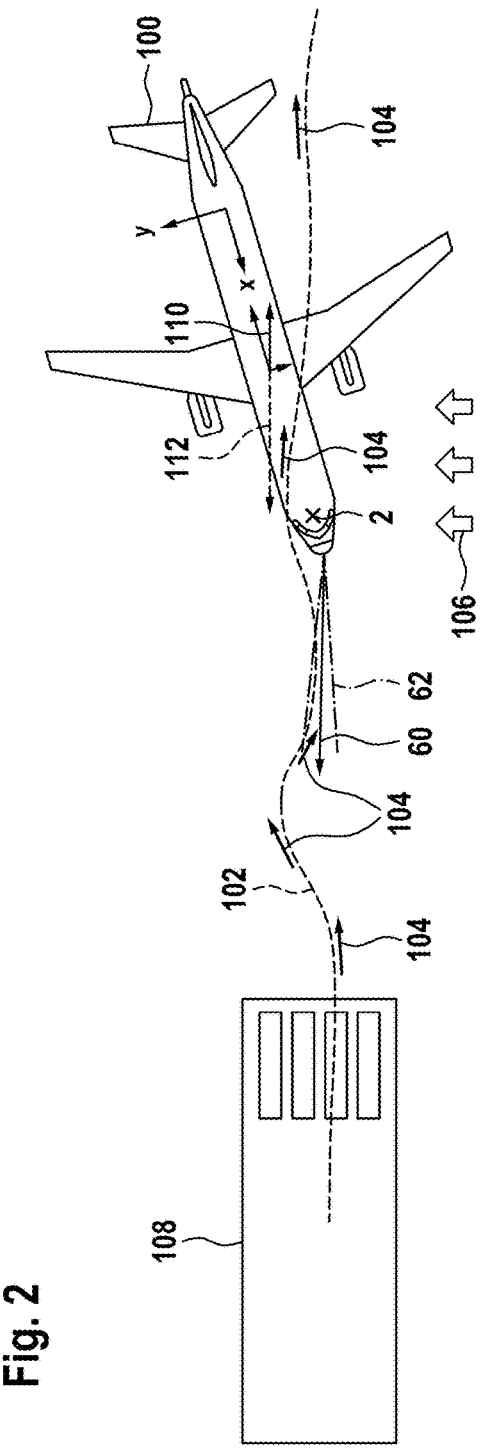
FIG. 2 shows the aircraft of FIG. 1 in a top view during a landing operation.
Figure 3:
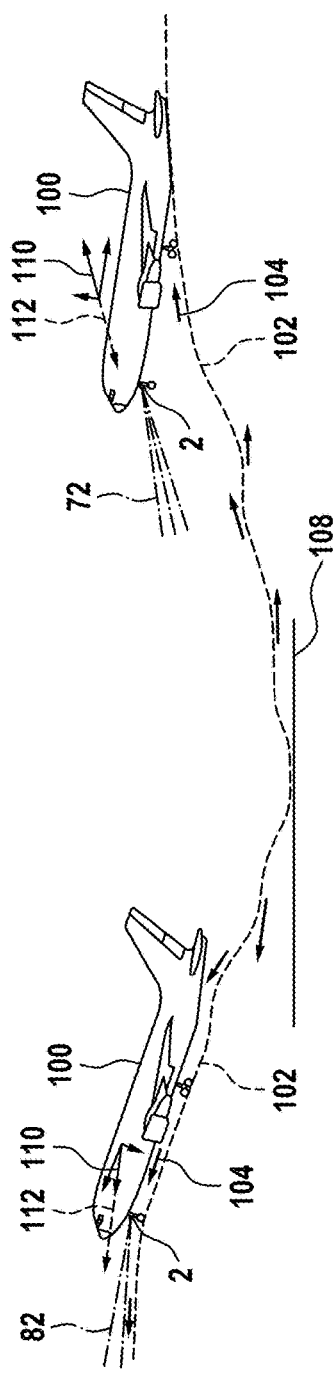
FIG. 3 shows the aircraft of FIG. 1 during the landing operation of FIG. 2 and during the take-off operation of FIG. 1 in a side view.

FIG. 1a shows an aircraft 100, which is a commercial passenger air plane in the exemplary embodiment of FIG. 1. The aircraft 100 is equipped with a dynamic exterior aircraft light unit 2 in accordance with an exemplary embodiment of the invention. The dynamic exterior aircraft light unit 2 of FIGS. 1 to 3 is a combined take-off and landing light unit. It is pointed out that separate light units may be provided as a take-off light unit and a landing light unit. In FIG. 1, the aircraft 100 is shown during a take-off operation from a runway 108. The rolling path along the runway 108 and the flight path after take-off are illustrated via a dashed line 102, hereinafter referred to as the flight path 102. The take-off operation takes place in a scenario with fairly heavy cross-wind 106, illustrated by three arrows.

During the take-off operation, the aircraft experiences various accelerations, with some of these accelerations at selected points along the flight path being illustrated by arrows 104. It is understood that, during a take-off operation, various kinds of accelerations are exerted onto the aircraft at virtually any point in time, with the arrows only being exemplary samples. The aircraft 100 experiences acceleration, on the one hand, as a consequence of its own behaviour, such as due to the operation of the engines and/or the operation of the various control flaps of the aircraft. On the other hand, the accelerations of the aircraft 100 are also caused by external influences, such as the cross-wind 106 and the gravity exerted onto the aircraft 100. As will be explained below, gravity is disregarded/compensated for and is thus not subject of the following description.

As stated above, the aircraft 100 is equipped with a dynamic exterior aircraft light unit 2 in accordance with exemplary embodiments of the invention. The dynamic exterior aircraft light unit 2 is mounted to a front running gear of the aircraft 100. As the aircraft 100 is shown in a top view and as the front running gear is disposed at a bottom side of the aircraft 100, the position of the dynamic exterior aircraft light unit 2 is marked with only a cross in FIG. 1a.

The dynamic exterior aircraft light unit 2 has a plurality of operating modes that differ with respect to their output light intensity distributions, in particular with respect to their main light emission directions, depending on the acceleration of the aircraft 100. The operation of the dynamic exterior aircraft light unit 2 and the selection of the operating mode to be used is described with respect to FIGS. 1a and 1b. In the exemplary embodiment of FIG. 1, the dynamic exterior aircraft light unit 2 has an acceleration sensor that senses the acceleration of the aircraft 100 with respect to the aircraft frame of reference. The aircraft frame of reference is indicated with the x/y coordinate system shown in FIG. 1a, with the x-direction being a longitudinal direction of the aircraft 100 and the y-direction being a transverse direction of the aircraft 100.

In the exemplary embodiment of FIG. 1a, the acceleration sensor senses the acceleration of the aircraft with a rate of 10 Hz. In other words, the acceleration sensor takes 10 acceleration measurements per second. For the selection of the appropriate operating mode, the dynamic exterior aircraft light unit takes into account the measured acceleration values of the passed 10 seconds, with these passed 10 seconds being referred to as the acceleration consideration interval. With the acceleration consideration interval being 10 seconds and the sampling rate of the acceleration sensor being 10 Hz, the dynamic exterior aircraft light unit 2 takes into account the most recent 100 acceleration values, as determined by the acceleration sensor. With the dynamic exterior aircraft light unit taking into account the passed 100 acceleration values and with this set of 100 values changing over time, the acceleration consideration interval is considered a rolling time interval. This rolling time interval may also be seen as a sliding window across the entirety of acceleration values generated during the flight.

Figure 1B:
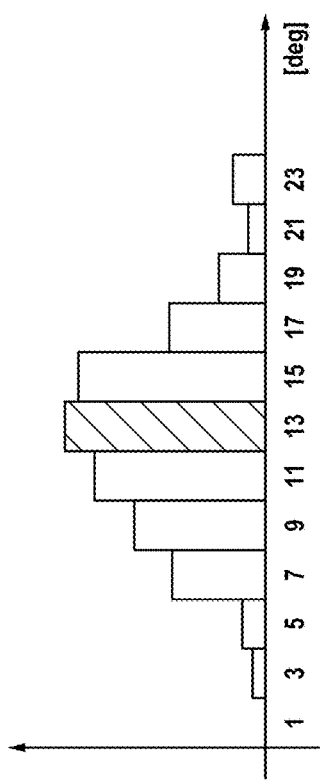

In the exemplary embodiment of FIG. 1, the acceleration values are determined in the x/y coordinate system and are represented as angular values with respect to the x-axis. At any point in time, the most recent 100 acceleration values are analysed in accordance with a histogram analysis. At the exemplary point in time of FIG. 1a, the most recent 100 measured acceleration values are split up into bins of a respective width of 2°. FIG. 1b shows the occurrences of acceleration values in the respective bins over the passed 100 measured acceleration values. The bin around 13° has the most occurrences in the passed 100 acceleration values. On the basis of this analysis, the dynamic exterior aircraft light unit 2 determines the direction of 13° with respect to the x-axis to be the net acceleration direction of the aircraft 100. The net acceleration direction is indicated with reference numeral 110 in FIG. 1a. It is shown in FIG. 1a as being composed of a x-component and a y-component. In this way, the net acceleration direction 110 is a calculated direction resulting from the measured acceleration values of the aircraft 100 during the acceleration consideration interval.

It is pointed out that, as the acceleration is measured in the aircraft frame of reference, the net acceleration direction reflects both the acceleration generated by the aircraft, which mainly is the positive acceleration due to the engines in the take-off operation, as well as the external influence of the cross-wind 106. The engine acceleration is mainly in the x-direction, while the cross-wind-induced acceleration is mainly in the y-direction.

It is further pointed out that other ways of determining the net acceleration direction may be used, such as forming an average of the measured acceleration values or forming a weighed average of the acceleration values or any other suitable way of relating the measured acceleration values within the acceleration consideration interval to each other.

The dynamic exterior aircraft light unit 2 is configured to use the net acceleration direction 110 as a basis for an estimate of the true heading direction of the aircraft 100. For the take-off operation, depicted in FIG. 1a, the estimate of the true heading direction corresponds to the net acceleration direction 110 and is indicated with reference numeral 112. It has been found that the estimate 112 of the true heading direction, based on the determination of the net acceleration direction 110, is a good estimate of the actual true heading direction of the aircraft 100, because the net acceleration direction 110 reflects both the acceleration due to the engines and the cross-wind influence, which leads to a rotation of the longitudinal direction of the aircraft 100 with respect to the true heading direction due to the pilot's reaction to the cross-wind.

The estimate 112 of the true heading direction is used by the dynamic exterior aircraft light unit 2 for selecting an operating mode with a main light emission direction that is substantially aligned with the estimate 112 of the true aircraft heading direction. In the exemplary embodiment of FIG. 1a at the depicted point in time, the dynamic exterior aircraft light unit 2 selects an operating mode having the main light emission direction 50 and having an opening angle 52 around the main light emission direction 50. In this way, the dynamic exterior aircraft light unit 2 illuminates a sector around the main light emission direction 50, which corresponds to the net acceleration direction 110. As a result, an illumination is provided by the dynamic exterior aircraft light unit 2 that provides for an illumination sector that is in line with a good approximation of the true heading direction of the aircraft 100, which is a direction the pilot is highly interested in.

FIG. 2 depicts the aircraft 100 of FIG. 1a in a landing situation. The aircraft 100 is depicted during an approach to the runway 108. Again, reference numeral 102 illustrates the flight path of the aircraft 100, reference numeral 104 depicts exemplary instances of accelerations of the aircraft 100, and arrows 106 depict the cross-wind present during the approach. Due to the cross-wind, the longitudinal direction of the aircraft 100 is again rotated with respect to the true heading direction of the aircraft towards the runway 108. As in FIG. 1, the dynamic exterior aircraft light unit 2, as shown in FIG. 2 for the landing phase of the flight, determines a net acceleration direction 110 on the basis of the measured acceleration values over the latest 10 seconds of the flight.

The determination of the estimate 112 of the true heading of the aircraft is carried out on a adjusted principle for the approach situation, as compared to the take-off situation of FIG. 1a. In particular, the dynamic exterior aircraft light unit 2 determines the estimate 112 of the true aircraft heading direction to be the inverse, as compared to the net acceleration direction 110. This is because the aircraft 100 is generally decelerated in the landing situation, but the direction of interest for the pilot is still ahead of the aircraft 100. Apart from this inversion, the net acceleration direction 110 still provides a good estimate of the true heading direction of the aircraft 100.

Again, as described with respect to FIG. 1, the estimate 112 is used for selecting that operating mode of the dynamic exterior aircraft light unit 2 that is most aligned with the estimate 112. In the exemplary embodiment of FIG. 2, the dynamic exterior aircraft light unit 2 selects an operating mode with a main right emission direction 60 and an opening angle 62 around the main light emission direction 60. The main light emission direction 60 corresponds to the net acceleration direction 110, with the reversal of the direction being seen as a particular case of correspondence between the two directions.

FIG. 3 shows the aircraft 100 of FIGS. 1 and 2 in a landing situation, which is depicted on the right side of FIG. 3, and in a take-off situation, which is depicted on the left side of FIG. 3, in a side view. FIG. 3 illustrates the principle of selecting an appropriate operating mode on the basis of determining the net acceleration direction with respect to the longitudinal direction and the vertical direction in the aircraft frame of reference. While the longitudinal and transverse components of the acceleration were depicted in and described with respect to FIGS. 1 and 2, the longitudinal and vertical components of the acceleration are depicted in FIG. 3 and will be described hereinafter. When combining the two approaches, the dynamic exterior aircraft light unit 2 can carry out a three-dimensional analysis of the acceleration of the aircraft 100 and can select an operating mode that is appropriate/desired for the three-dimensional behavior of the aircraft 100. It is, however, pointed out that the dynamic exterior aircraft light unit 2 may also be configured to adapt the operating mode to the acceleration in one or two of those three dimensions only, while using default output light emission characteristics in the other dimension(s).

During the landing operation, which is depicted on the right side of FIG. 3, the aircraft 100 is generally accelerated in a negative manner in a longitudinal direction of the aircraft, i.e. it is decelerated with respect to its direction of longitudinal extension, and is generally accelerated in an upwards direction in the aircraft frame of reference. This second component of the acceleration may seem counter-intuitive at first glance, because the flight path is downwards. However, as the flight path commonly has a substantially fixed glide angle with respect to ground during the approach and as the speed in the longitudinal direction decreases, the downwards speed also decreases for keeping the glide angle constant. Hence, the aircraft 100 experiences an upwards acceleration. Based on these two components of the acceleration, as measured by the acceleration sensor of the dynamic exterior aircraft light unit 2 over time, the net acceleration direction 110 towards the back and upwards in the aircraft frame of reference is determined. As pointed out above, the net acceleration direction 110 may be determined in a number of different ways.

As in the examples of FIGS. 1 and 2, the net acceleration direction 110 is used for determining an estimate 112 of the true heading direction of the aircraft 100. For the landing scenario of FIG. 3, the estimate 112 of the true heading direction is opposite the net acceleration direction 110. On the basis of the estimate 112 of the true heading direction, the dynamic exterior aircraft light unit 2 is configured to select an operating mode whose main light emission direction is a good approximation of the estimate 112 of the true heading direction. In particular, the dynamic exterior aircraft light unit 2 may select that operating mode out of the plurality of operating modes whose main light emission direction is closest to the estimate 112 of the true heading direction. The opening angle 72 of the selected operating mode is depicted in FIG. 3.

To the left side of FIG. 3, the take-off operation of the aircraft 100, as depicted in FIG. 1 in a top view, is shown in a side view. As on the right side of FIG. 3, the left side of FIG. 3 is provided for showing and describing the selection of an appropriate operating mode of the dynamic exterior aircraft light unit 2 on the basis of the acceleration of the aircraft 100 in the longitudinal and vertical dimensions of the aircraft 100. During the take-off operation, the aircraft 100 is generally accelerated forward and upwards in the frame of reference of the environment. In the aircraft frame of reference, the aircraft 100 is generally accelerated in a positive manner in the longitudinal direction of the aircraft 100 and accelerated in a downwards direction of the aircraft. This is due to the angle of attack of the aircraft 100 commonly deviating towards the top from the true aircraft heading direction, i.e. because the angle of attack of the aircraft 100 commonly has a larger angle with respect to ground than the true aircraft heading. Nevertheless, the net acceleration direction 110 still provides a good estimate of the true heading direction of the aircraft 100. Again, it is pointed out that the net acceleration direction 100 can be determined in various different ways from past acceleration values, as described above with respect to FIG. 1.

In the take-off situation of the exemplary embodiment of FIG. 3, the dynamic exterior aircraft light unit 2 is configured to determine the estimate 112 of the true heading direction of the aircraft 100 as equaling the determined net acceleration direction 110. Further, the dynamic exterior aircraft light unit 2 is configured to select an operating mode whose main light emission direction is aligned as much as possible to the estimate 112 of the true heading direction of the aircraft 100. In this way, the main light emission direction corresponds to the determined net acceleration direction 110. The dynamic exterior aircraft light unit 2 selects an operating mode with an opening angle 82 around the main light emission direction.

It is pointed out that the acceleration sensor of the dynamic exterior aircraft light unit 2 of FIG. 3 determines gravity-compensated acceleration values. That means that the acceleration sensor determines the acceleration experienced by the aircraft 100, with the exception of the acceleration caused by gravity. In other words, the measured acceleration values describe the behavior of the aircraft 100 in a hypothetical environment without gravity. Gravity-compensation in acceleration sensors is per se known to the skilled person.

It is pointed out that the opening angle 72, as shown on the right side of FIG. 3 for the landing situation, is wider than the opening angle 82, as shown on the left side of FIG. 3 for the take-off situation. This is because the dynamic exterior aircraft light unit 2 is configured to select an operating mode with a wider opening angle, when the net acceleration direction has a negative component along the longitudinal direction of the aircraft 100, and to select an operating mode with a more narrow opening angle, when the net acceleration direction has a positive component along the longitudinal direction of the aircraft 100. In this way, a wider illumination of the environment is achieved in a landing situation, as compared to a take-off situation. In particular, the dynamic exterior aircraft light unit 2 may be configured to continuously widen the opening angle for a persisting negative acceleration along the longitudinal extension of the aircraft 100 and/or to continuously narrow the opening angle for a persisting positive acceleration along the longitudinal extension of the aircraft 100.

It is again emphasized that the combination of the scenarios of FIGS. 1 to 3, in particular the combination of the acceleration components as described in FIGS. 1 and 3 for the take-off operation and in FIGS. 2 and 3 for the landing operation, leads to a selection of appropriate operating modes taking into account the full three-dimensional acceleration of the aircraft. It is further pointed out that, while the dynamic exterior aircraft light unit 2 may be a combined take-off and landing light unit, as shown in FIGS. 1 to 3, it is also possible that a landing light unit and a take-off light unit are provided separately, with the two light units separately implement the functionality, described with respect to FIGS. 1 to 3. Also, while it has been described with respect to FIGS. 1 to 3 that the net acceleration direction 110 is determined by the dynamic exterior aircraft light unit 2 from a plurality of acceleration values, it is also possible that a single momentary acceleration value is used for determining the net acceleration direction.

Figure 4A:
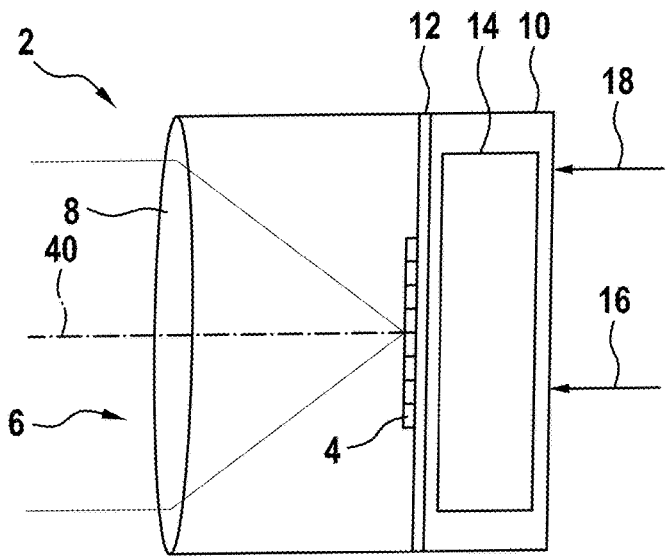
FIGS. 4a-4b show a schematic illustration of a dynamic exterior aircraft light unit in accordance with exemplary embodiments of the invention.

FIG. 4a shows a schematic illustration of a dynamic exterior aircraft light unit 2 in accordance with an exemplary embodiment of the invention. The dynamic exterior aircraft light unit 2 comprises a housing 10, whose inner space is separated into two parts by a mounting plate 12. Attached to the mounting plate 12, there is provided an LED group 4. The LED group 4 comprises a two-dimensional array of LEDs, one row of which is shown in the schematic illustration of FIG. 4a. The depicted row consists of eight individual LEDs arranged in a linear configuration in the exemplary embodiment. The dynamic exterior aircraft light unit 2 further comprises an optical system 6. In the exemplary embodiment of FIG. 4a, the optical system 6 consists of a lens 8. In operation, the LEDs of the LED group 4 emit light towards the lens 8 of the optical system 6.

On the other side of the mounting plate 12, there is provided a control unit 14. The control unit 14 is coupled to a power input 16 and to an acceleration signal input 18. In this way, the control unit 14 receives power from an external power source, such as the aircraft power network, via the power input 16. It further receives acceleration data via the acceleration signal input 18, the acceleration data indicating the acceleration of the aircraft. The acceleration data is provided to the dynamic exterior aircraft light unit 2 by an aircraft board computer or by one or more acceleration sensors, external to the dynamic exterior aircraft light unit 2, in the exemplary embodiment of FIG. 4a.

The control unit 14 is further coupled to the LED group 4 and controls each of the LEDs of the LED group 4 individually. In particular, the control unit 14 is configured to selectively switch each of the LEDs of the LED group 4 on, depending on the operating mode that the control unit 14 determines appropriate for the received acceleration data. The control unit 14 determines the appropriate operating mode on the basis of the net acceleration direction, as deduced from the information gained from a time series of acceleration data, received at the acceleration signal input 18. Details with respect to setting an appropriate operating mode have been described above. The control unit 14 may have hardware circuitry for determining an operating mode and controlling the LEDs from the acceleration data. It is also possible that the control unit 14 has a microprocessor running a software program. A combination of hardware and software is also possible.

Figure 4B:
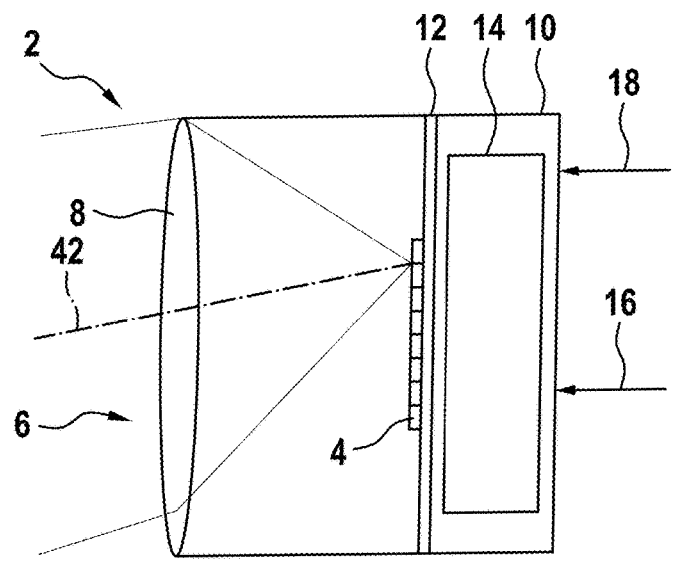

In FIG. 4a, a first illustrative operating mode of the dynamic exterior aircraft light unit 2 is shown. In the first illustrative operating mode, the two center LEDs of the shown portion of the LED group 4 are switched on, i.e. the two center LEDs emit light in the first illustrative operating mode. As can be seen from the depicted three exemplary light rays, the lens 8 substantially collimates the light emitted by the LEDs and outputs said light in a first main light emission direction 40. In FIG. 4b, a second illustrative operating mode of the dynamic exterior aircraft light unit 2 of FIG. 4a is shown. In particular, in the second illustrative operating mode, the top two LEDs of the shown portion of the LED group 4 are switched on. The light emitted by the two top LEDs of the LED group 4 is transformed into an output light intensity distribution of the second illustrative operating mode by the lens 8. As can be seen from the three depicted exemplary light rays, the light of the top two LEDs of the LED group 4 results in an output light intensity distribution that is angled somewhat towards the bottom in the drawing plane of FIG. 4b. The main light emission direction 42 of the output light intensity distribution of the second illustrative operating mode is slightly angled towards the bottom in the drawing plane of FIG. 4b.

From the comparison of FIG. 4a and FIG. 4b, it can be seen that each of the LEDs of the LED group 4 has a different contribution to the overall output light intensity distribution of the dynamic exterior aircraft light unit 2. It is apparent that a wide variety of output light intensity distributions can be achieved by operating different subsets of the LEDs of the LED group 4. Accordingly, various different operating modes of the dynamic exterior aircraft light unit 2 with different output light intensity distributions can be achieved by operating different subsets of LEDs.

The exemplary dynamic exterior aircraft light unit 2 of FIG. 4 is configured to have a plurality of operating modes, with the operating modes differing with respect to their output light intensity distributions. The selection of the operating mode is carried out on the basis of the acceleration of the aircraft, as indicated via the acceleration data, received via the acceleration angle signal input 18.

The exemplary dynamic exterior aircraft light unit 2 may be arranged at the running gear of the aircraft or at a wing of the aircraft or at any other suitable structure. It may have a lens cover that protects its face from environmental influences.

Figure 5:
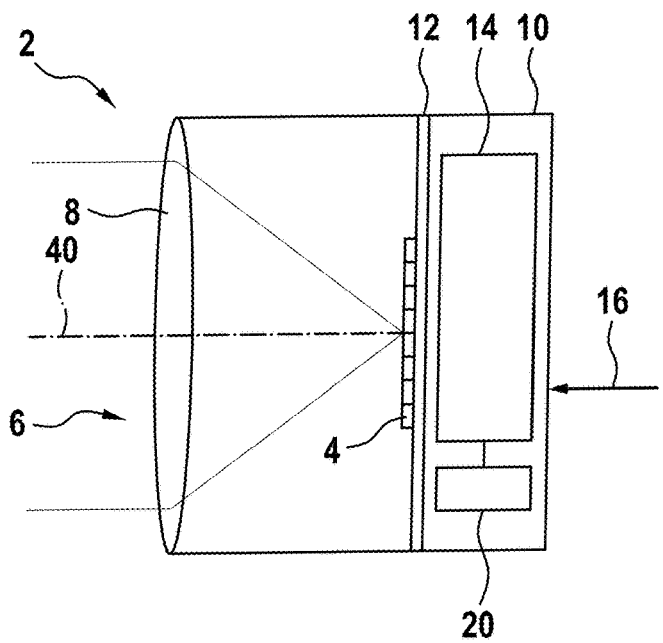
FIG. 5 shows a schematic illustration of another dynamic exterior aircraft light unit in accordance with exemplary embodiments of the invention.

FIG. 5 shows a schematic illustration of a dynamic exterior aircraft light unit 2 in accordance with another exemplary embodiment of the invention. The dynamic exterior aircraft light unit 2 is very similar to the dynamic exterior aircraft light unit 2 of FIG. 4 and is shown in the same operating mode, as depicted in FIG. 4a. The dynamic exterior aircraft light unit 2 of FIG. 5 differs from the dynamic exterior aircraft light unit 2 of FIG. 4 in that it does not have an acceleration signal input 18. However, the dynamic exterior aircraft light unit 2 of FIG. 5 has an acceleration sensor 20, disposed in the housing 10. The acceleration sensor 20 senses the acceleration of the aircraft in three dimensions in the aircraft frame of reference. The acceleration sensor 20 is coupled to the control unit 14 and provides measured acceleration values to the control unit 14. The operation of the control unit 14 is equal to the operation of the control unit 14 of the dynamic exterior aircraft light unit 2 of FIG. 4. It determines an appropriate operating mode on the basis of the acceleration data and controls the LED group 4 accordingly.

FIG. 6 shows a schematic illustration of an alternative combination of an optical system 6 and an LED group 4. This alternative combination is also able to achieve different output light intensity distributions for different operating modes and may thus also be used in dynamic exterior aircraft light units in accordance with exemplary embodiments of the invention.

Figure 6A:
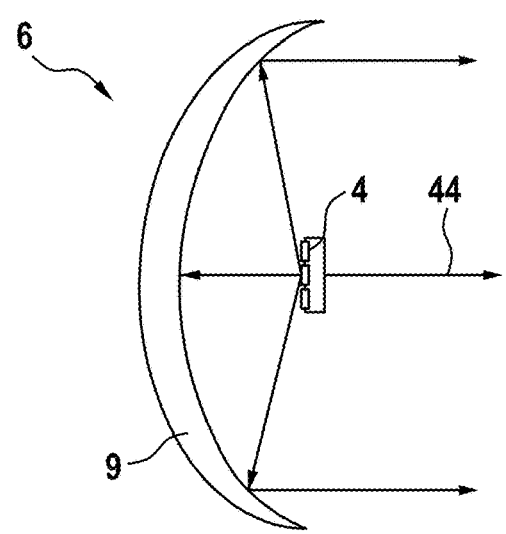
FIGS. 6a-6c show a schematic illustration of a combination of an LED group and an optical system, which can be used in a dynamic exterior aircraft light unit in accordance with exemplary embodiments of the invention.
Figure 6B:
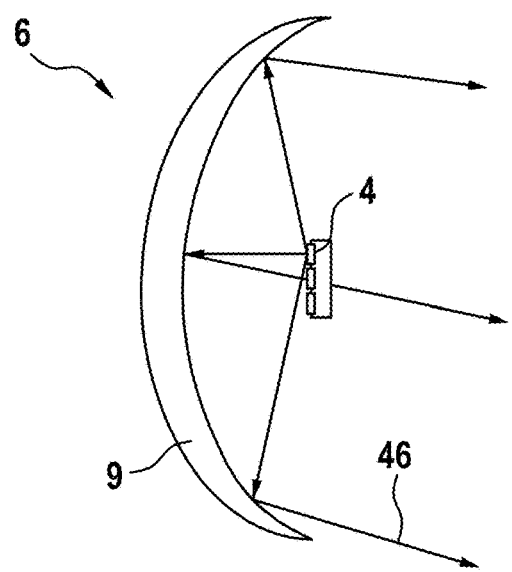
Figure 6C:
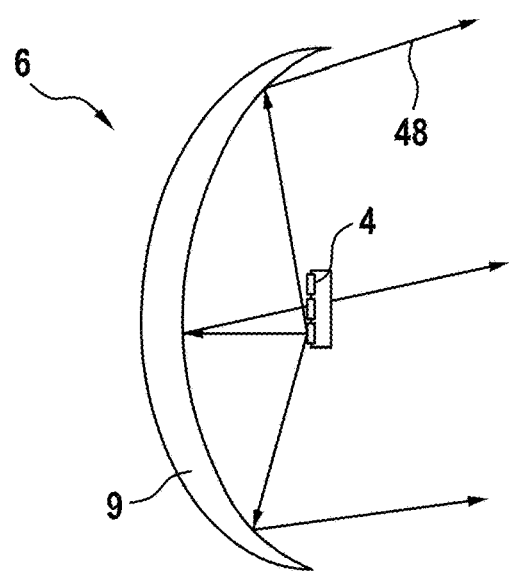

In FIG. 6, the optical system consists of a reflector 9, which is a collimating parabolic reflector in the exemplary embodiment of FIG. 6. The center LED of the LED group 4 is arranged in the focal point of the reflector 9, leading to a collimated output light intensity distribution in a direction 44 in a first illustrative operating mode (FIG. 6a), wherein the center LED is switched on. The top and bottom LEDs of the LED group 4 are arranged at a distance from the focal point of the reflector 9, such that the switching on of the top LED or of the bottom LED of the LED group 4 results in an illustrative output light intensity distribution that is angled towards the bottom (in a direction 46 in FIG. 6b) or angled towards the top (in a direction 48 in FIG. 6c) and has a somewhat wider, but still narrow opening angle.

Again, it can be seen that the selective switching of different LEDs of the LED group 4 leads to different contributions to the overall output light intensity distribution of the dynamic exterior aircraft light unit 2. It is again apparent that a wide variety of operating modes, having different output light intensity distributions, can be achieved via the switching of different subsets of LEDs.

It is pointed out that the optical system 6 may comprise multiple elements, that the optical system 6 may comprise a combination of one or more lenses and/or one or more reflectors, and that the lenses and reflectors may be non-collimating lenses and non-collimating reflectors, depending on the output light intensity distributions that are to be achieved in the different operating modes. It is further pointed out that larger numbers of operating modes may be achieved with larger numbers of LEDs, in particular with two-dimensional arrangements of LEDs having a large number of LEDs. The principles illustrates in FIGS. 4 to 6 may be extended to more complex LED arrangements within the dynamic exterior aircraft light unit 2.

It is further pointed out that the group of LEDs may comprise two or more sub-groups of LEDs, with each sub-group of LEDs having its own optical system associated therewith. For example, the dynamic exterior aircraft light unit 2 may have multiple optical sets, each optical set consisting of a lens 8 and LEDs 4, as depicted in FIG. 4, or of a reflector 9 and LEDs 4, as depicted in FIG. 6. It is also possible that each LED of the group of LEDs has its own optical system associated therewith.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A dynamic exterior aircraft light unit, configured for being mounted to an aircraft (for illuminating an aircraft environment, the dynamic exterior aircraft light unit comprising:
    an LED group, comprising a plurality of LEDs, and
    an optical system, comprising at least one optical element, the optical system being associated with the LED group for shaping an output light intensity distribution from the light emitted by the LED group,
    wherein the LED group and the optical system are stationary within the dynamic exterior aircraft light unit, with each LED of the LED group having a set position with respect to the optical system, and
    wherein the dynamic exterior aircraft light unit is configured to be operated in a plurality of operating modes, with a respective subset of the plurality of LEDs being switched on in each of the plurality of operating modes and with a different output light intensity distribution being emitted by the dynamic exterior aircraft light unit in each of the plurality of operating modes,
    wherein a selection of the operating mode depending on an acceleration of the aircraft in the aircraft frame of reference,
    wherein the selection of the operating mode depends on the acceleration of the aircraft over an acceleration consideration interval, and
    wherein the dynamic exterior aircraft light unit is configured to determine a net acceleration direction from the acceleration of the aircraft over the acceleration consideration interval, wherein the selection of the operating mode depends on the net acceleration direction.

2. The dynamic exterior aircraft light unit according to claim 1, wherein the dynamic exterior aircraft light unit is one of a landing light unit, a take-off light unit, a taxi light unit, and a runway turn-off light unit.

3. The dynamic c exterior aircraft light unit according to claim 1, wherein the acceleration consideration interval is between 5 s and 1 min.

4. The dynamic exterior aircraft light unit according to claim 1, wherein the acceleration consideration interval is a rolling time interval.

5. An aircraft comprising at least one dynamic exterior aircraft light unit according to claim 1, mounted externally to the aircraft.

6. The dynamic exterior aircraft light unit according to claim 1, wherein each of the plurality of operating modes has a main light emission direction and wherein the plurality of operating modes differ with respect to their main light emission directions, with the selection of a particular operating mode being such that the main light emission direction of the particular operating mode corresponds to the net acceleration direction.

7. The dynamic exterior aircraft light unit according to claim 1, configured to determine the net acceleration direction on the basis of at least one of an average of the acceleration of the aircraft over the acceleration consideration interval, a weighed average of the acceleration of the aircraft over the acceleration consideration interval, and a histogram analysis of the acceleration of the aircraft over the acceleration consideration interval.

8. The dynamic exterior aircraft light unit according to claim 1, wherein the acceleration of the aircraft is a three-dimensional acceleration of the aircraft.

9. The Dynamic exterior aircraft light unit according to claim 1, wherein the acceleration of the aircraft is a gravity-compensated acceleration of the aircraft.

10. The dynamic exterior aircraft light unit according to claim 1, further comprising at least one of:
    an acceleration signal input, configured for receiving acceleration data with respect to the acceleration of the aircraft from an external source, such as from at least one external acceleration sensor or from a board computer, and
    at least one acceleration sensor, configured to measure the acceleration of the aircraft.

11. The dynamic exterior aircraft light unit according to claim 1,
    wherein the dynamic exterior aircraft light unit is configured to increase an opening angle of the output light intensity distribution for a negative acceleration in a longitudinal direction of the aircraft, and/or
    wherein the dynamic exterior aircraft light unit is configured to decrease an opening angle of the output light intensity distribution for a positive acceleration in a longitudinal direction of the aircraft.

12. A method of operating a dynamic exterior aircraft light unit of an aircraft, comprising an LED group, comprising a plurality of LEDs, and an optical system, comprising at least one optical element, the optical system being associated with the LED group for shaping an output light intensity distribution from the light emitted by the LED group, wherein the method comprises the steps of:
    determining an acceleration of the aircraft in the aircraft frame of reference and determining a net acceleration direction from the acceleration of the aircraft over an acceleration consideration interval, selecting one of a plurality of operating modes depending on the net acceleration direction, with the plurality of operating modes differing with respect to their respective output light intensity distributions emitted by the dynamic exterior aircraft light unit, and switching on a respective subset of the plurality of LEDs depending on said selected one of the plurality of operating modes.

\* \* \* \* \*